Feb. 8, 1966     R. H. GALE ETAL     3,234,104
NUCLEAR REACTOR CONTROL ROD HAVING PARTICULATE CORE
Filed Dec. 30, 1963

United States Patent Office 3,234,104
Patented Feb. 8, 1966

3,234,104
NUCLEAR REACTOR CONTROL ROD HAVING PARTICULATE CORE
Richard H. Gale, West Hartford, and Charles E. Burdg, Suffield, Conn., assignors to Combustion Engineering, Inc., Windsor, Conn., a corporation of Delaware
Filed Dec. 30, 1963, Ser. No. 334,166
7 Claims. (Cl. 176—86)

This invention relates generally to the nuclear reactor art and has particular relation to an improved control rod for use with such reactors for either regulating the output thereof or for providing a complete shutdown of the reactor or both.

Present control rod designs are very costly with this being true even when the control rod is employed in a new core that is placed in storage awaiting the time that it is to be installed into a reactor. It is the purpose of the present invention to provide a control rod design which is considerably less expensive to manufacture than the designs heretofore utilized and wherein the poison material that is contained within the control rod is in the form of a fine particulate material or powder. This poison material is much less costly than the metal or the pellets that have been used heretofore in control rods and furthermore with the control rod design of the invention, the concentration of the poison material may be varied as desired throughout the length of the control rod.

Accordingly, it is an object of this invention to provide an improved control rod for use with nuclear reactors.

A further object of the invention is to provide such an improved control rod wherein the control material is a relatively fine powder or particulate material that is contained within a housing or shell that defines and establishes the configuration of the control rod.

Another object of the invention is to provide an improved control rod the neutron absorption cross-section of which may vary as desired throughout the length of the rod.

Other and further objects of the invention will become apparent to those skilled in the art as the description proceeds.

With the aforementioned objects in view, the invention comprises an arrangement, construction and combination of the elements of the inventive organization in such a manner as to attain the desired results, as hereinafter more particularly set forth in the following detailed description of an illustrative embodiment, said embodiment being shown by the accompanying drawing wherein.

Figure 1:
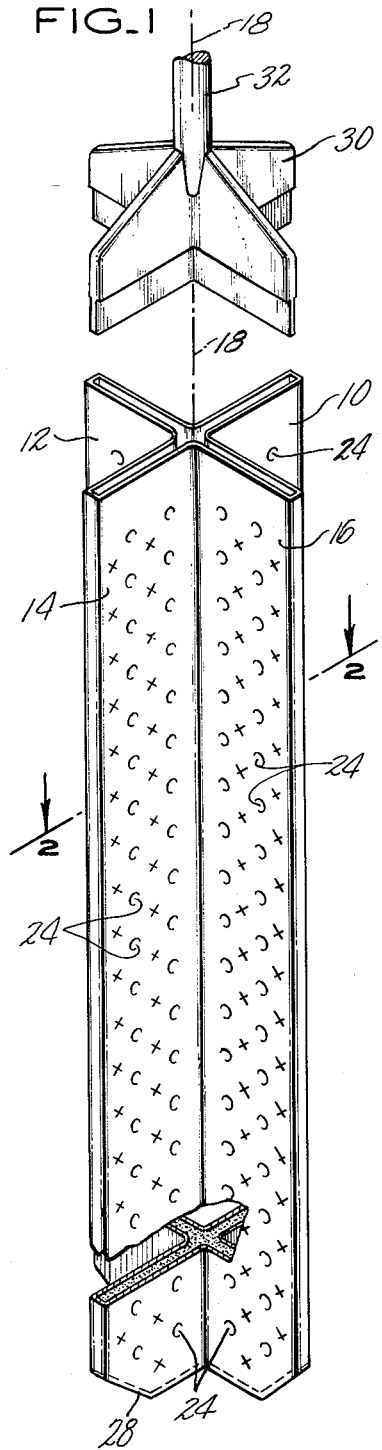
FIGURE 1 is a perspective view of the control rod of the invention, with the head or cap that forms a part of this control rod being elevated from the body portion of the rod in this view.
Figure 2:
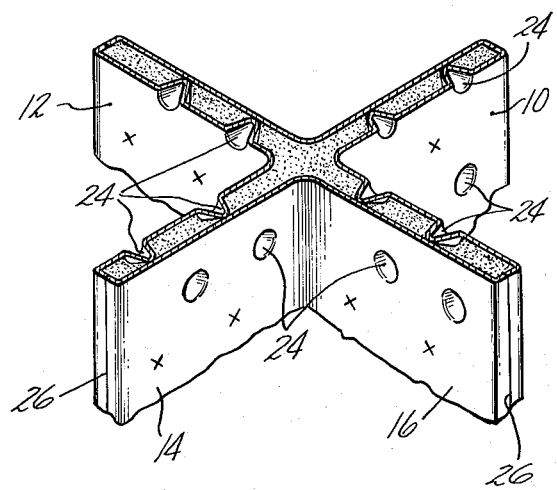
FIGURE 2 is a section in the nature of a perspective view and to enlarged scale in relation to the FIGURE 1 showing, with this FIGURE 2 section being taken generally along line 2—2 of FIGURE 1.
Figure 3:
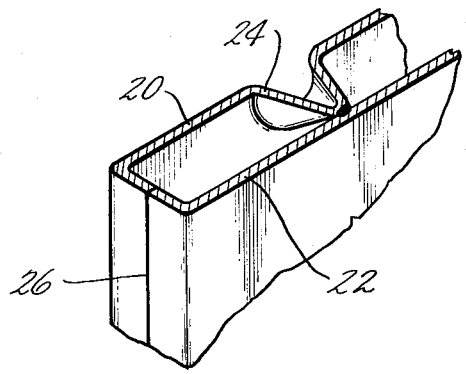
FIGURE 3 is an enlargement of the detail identified in the circle in FIGURE 2.

Referring now to the drawings, wherein like reference numerals are used throughout to designate like elements, the illustrative and preferred embodiment of the invention depicted therein includes a blade type control rod of cruciform transverse section such that there are four blades 10, 12, 14, and 16 that emanate or extend radially from the central axis 18 of the control rod. (Other transverse configurations may be employed, if desired, such as Y or box.) Each of the control rod blades is fabricated of a stainless steel housing within which is disposed loose particulate material that contains the neutron poison or in other words the material that has a very high neutron absorption cross-section. The stainless steel plates, which may be .020 inch sheet material, are identified in FIGURES 2 and 3 as 20 and 22 respectively. These plates, of each control rod blade, or at least one of the plates of each control rod plate, is provided with dimples or indentations 24 which are directed toward the other plate of the blade with these indentations being of uniform elevation and distributed generally uniformly throughout the area of the control rod blade. The innermost extremity of these indentations 24 is in contact with and is welded to the other plate as by spot welding, whereby a rigid structure is formed. The outer extremities of the plates 20 and 22 are bent, as shown best in FIGURE 3, generally at 90° so that these outer edges are in an abutting relation at 26, being there welded together to form a fluid tight joint.

In the illustrative embodiment, the adjacent sides of adjacent blades are formed of a common sheet metal member with there thus being four stainless steel sheets, each being bent in L-shaped or in other words at right angles with their edges being joined at 26, as previously mentioned, to thereby form the four blades that make up the control rod. As a result of the blades extending radially from the axis 18 as disclosed and the dimpling and spot welding of the sheet metal members, a strong and rigid structure is provided which may be very accurately dimensioned with the spacing of the sheet metal members that form the outer shell or housing for each of the blades being accurately maintained.

The lower end of the blades of the control rod are sealed by means of a stainless steel member 28 inserted intermediate plates 20 and 22 and welded to these plates.

The space intermediate plates 20 and 22 is filled with a particulate material that contains a neutron poison, with boron carbide being a prefererd material for use with the control rod of the invention. This material which is relatively fine in nature of a powder, is inserted or positioned within the volume defined by the spaced sheet metal members at 20 and 22 and is vibratorily compacted thereinto preferably to a density of greater than 75 percent of theoretical. To achieve this desired density the largest particle size should be ⅓ to ¼ of the smallest free span available in the housing within which this material is to be vibratorily compacted. Satisfactory results may be achieved by dividing the material into three groups with the first group having particles ranging from the previously mentioned largest particle size down to submicron particles, while the second group has its greatest or largest particle generally within the range of ⅙ to ⅒ of the largest particle of the first group and with the particles in the second group also ranging down to submicron particles. The particles in the third group have a size such that the largest particle is between ⅙ and ⅒ of the largest particle of the second group with this third group also having particles ranging from this largest particle size down to submicron particle sizes. The various percentages of these three groups may vary, with satisfactory results being obtained with a mixture that employs 65 weight percent of the first group, 15 weight percent of the second group and 20 weight percent of the third group.

The material is placed within the housing of volume of each of the blades and is vibratorily compacted to the desired density. Thereafter, the cap member 30 is assembled with a portion of this cap member being inserted intermediate plates 20 and 22 of each of the control rod blades and welded into place. The entire assembly is, of course, fluid tight and the cap member 30 is provided with an extension or connector 32 for connecting with an actuating member or manipulating device for movement of the control rod longitudinally of the axis 18.

With this control rod design the neutron absorption cross-section worth of the control rod may be varied as desired, throughout the length of the rod. For instance, it may be desirable to use the control rod for both regulation and shutdown of the reactor. In such a case it would be of advantage to have the lower portion of the control rod which may be adjustably moved into and out of the reactor core to adjust the power output of the core during operation of the reactor by what is termed a gray rod or have a medium neutron absorption cross-section. It would also be desirable to have the upper region of the control rod which is inserted into the reactor core during shutdown be of a black rod or have a high neutron absorption cross-section. Since the boron-10 isotope has the high neutron absorption cross-section the amount of this isotope in the material that is placed within the control rod may be varied so that the uppermost region of the control rod has a substantially greater concentration of this boron-10 isotope in the remainder of the control rod and thereby the aforementioned results may be achieved. In another embodiment of the invention it may be desired to have the lower portion of the control rod have the greatest neutron absorption cross-section and the neutron absorption cross-section worth of the rod decrease upwardly toward the upper end. This would be desirable in a rod that is employed for the purpose of shutting down the reactor where the rod is normally withdrawn from the reactor. In such an instance, the lower region of the control rod would, during operation of the reactor, be closer to the core and accordingly in a region of greater reactivity than the upper region. Since boron is a burnable poison and thus becomes less effective with time when subjected to radiation, it would be desired, as aforementioned, to have the lower region of the control rod of a greater neutron absorption cross-section than the upper region. This, of course, may be readily achieved with the present invention by utilizing a material in the lower region which is enriched in the boron-10 isotope relative to the particulate material positioned in the control rod portion above the lower region. This variation with regard to the boron-10 isotope is effected when the material is loaded into the volume intermediate plates that make up the blades of the control rod which material after loading is, of course, vibratorily compacted to its desired density.

It will thus be apparent that with the invention there is provided an improved control rod assembly which may be readily and inexpensively manufactured.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A control rod for a nuclear reactor comprising in combination a plurality of elongated flat blades extending outwardly from a common axis, each of said blades being in a form of a pair of spaced relatively thin sheet members being joined in a fluid tight manner at their outer edges, said sheet members being maintained in generally uniform spaced relation throughout the area of the blade by inwardly extending indentations being formed at least on one of said sheet members and disbursed throughout the area of said member in contacting relation with the other sheet member, said sheet members being secured together at these areas of contact, the volume between said plate members being filled with a loose particulate material to a density of at least 75 percent of theoretical and with this particulate material containing a neutron poison.

2. A blade type control rod for a nuclear reactor wherein the blades are formed of a pair of sheet metal members secured together in accurately spaced relation by means of indentations formed on one of said members and extending toward the other with these indentations being of uniform elevation and disbursed generally uniformly throughout the area of the blade, the innermost region of the indentations contacting the other sheet metal member with the sheet metal members being bonded together at this junction of contact, means enclosing the volume between the spaced sheet metal members, and a powder compacted into the volume thus provided between the sheet metal members with this powder containing a neutron poison and being compacted to a density of at least 75 percent of theoretical.

3. A control rod for use with a nuclear reactor and wherein the rod is comprised of a plurality of blade members that extend radially outward from a common axis characterized by each of the blades being formed of sheet metal members that are maintained in accurately spaced relation by indentations formed on one of said members extending toward and engaging the other of said members, the sheet metal members being bonded together at this location of contact, a loose particulate material disposed in the volume between the plates and compacted to a density of at least 75 percent of theoretical, with this particulate material containing a neutron poison.

4. The organization of claim 3 wherein the adjacent sides of adjacent blades are formed of a single sheet metal member.

5. The organization of claim 3 wherein the outer extremities of the spaced plates of each blade are bent towards each other and are joined together.

6. The organization of claim 3 wherein the control rod is provided with means at one end for moving the rod along the longitudinal axis thereof, with the particulate material containing $B_4C$ and with the boron-10 isotope of this material within the control rod being in greater concentration at a region of the rod adjacent said one end than in the remainder of the control rod.

7. The organization of claim 3 wherein the control rod is provided with means at one end for moving the rod along the longitudinal axis thereof, the particulate material within the rod containing $B_4C$ with the boron-10 isotope being of progressively increasing concentration from the region of the rod adjacent one end toward the other end of the rod.

References Cited by the Examiner
UNITED STATES PATENTS

| | | | |
|---|---|---|---|
| 3,103,478 | 9/1963 | Kooistra | 176—86 |
| 3,141,227 | 7/1964 | Klepfer | 176—86 |

CARL D. QUARFORTH, *Primary Examiner.*

REUBEN EPSTEIN, *Examiner.*